United States Patent [19]

Gilbert et al.

[11] 4,239,639
[45] Dec. 16, 1980

[54] GRANULAR DETERGENT COMPOSITION COMPRISING AIR-SENSITIVE MATERIAL IN PROTECTIVE BAG

[75] Inventors: Lawrence A. Gilbert, Fairfield; Jeffrey R. Leist, Cincinnati, both of Ohio

[73] Assignee: The Procter & Gamble Company, Cincinnati, Ohio

[21] Appl. No.: 50,032

[22] Filed: Jun. 19, 1979

[51] Int. Cl.³ .................. B32B 15/08; B32B 15/12; B65D 75/26; B65D 81/22
[52] U.S. Cl. .................. 252/90; 206/484; 206/484.2; 252/95; 252/99; 252/135; 428/335; 428/336; 428/339; 428/340; 428/342; 428/351; 428/354; 428/458; 428/462; 428/464; 428/486; 428/461; 428/507; 428/511; 428/513
[58] Field of Search .............. 206/484, 484.2; 252/90, 252/95, 99, 135; 428/335, 336, 337, 342, 351, 354, 458, 462, 464, 467, 486, 513, 461

[56] References Cited

U.S. PATENT DOCUMENTS

| | | | |
|---|---|---|---|
| 2,189,174 | 2/1940 | Hohl | 229/53 |
| 2,613,168 | 10/1952 | Totten | 428/458 |
| 3,355,348 | 11/1967 | Lamar | 428/464 |
| 3,458,111 | 7/1969 | Leasure | 229/17 |
| 3,488,252 | 1/1970 | Lamar | 428/513 X |
| 3,520,464 | 7/1970 | Pugh | 229/17 |
| 3,645,390 | 2/1972 | Ryan | 252/90 X |
| 3,949,114 | 4/1976 | Viola | 428/458 X |

FOREIGN PATENT DOCUMENTS

| | | | |
|---|---|---|---|
| 1032579 | 6/1966 | United Kingdom | 428/464 |
| 1508492 | 4/1978 | United Kingdom | 206/484.2 |

*Primary Examiner*—Dennis L. Albrecht
*Attorney, Agent, or Firm*—Robert B. Aylor; Richard C. Witte; Thomas H. O'Flaherty

[57] ABSTRACT

Granular detergent compositions comprising an air sensitive material are packaged in a pouch which comprises a reclosable spout structure, the pouch being formed by heat sealing a laminate comprising an outside layer of a high melting point material, an aluminum foil layer, a paper layer, and an inner layer of a low melting material capable of acting as a glue.

7 Claims, No Drawings

GRANULAR DETERGENT COMPOSITION COMPRISING AIR-SENSITIVE MATERIAL IN PROTECTIVE BAG

TECHNICAL FIELD

This invention relates to granular detergent compositions containing materials which are adversely affected by exposure to air. Specific examples of such detergent compositions are ones containing silicates and/or bleach materials. Such compositions require special packaging to maintain their effectiveness in storage and especially after the consumer has opened the package and used a portion of the contents.

BACKGROUND ART

Bags or pouches prepared from flexible materials are exemplified in U.S. Pat. No. 3,458,111, Leasure, issued July 29, 1969; U.S. Pat. No. 2,189,174, Hohl; U.S. Pat. No. 3,520,464, Pugh, issued July 14, 1970; and numerous other similar patents. All of the above patents are incorporated herein by reference.

SUMMARY OF THE INVENTION

The present invention relates to granular detergent compositions which contain at least one ingredient that is air-sensitive, packaged in a pouch formed by heat-sealing a laminate material. The structure of said pouch comprises a reclosable spout and the material used for forming said pouch is a laminate comprising (a) an outer layer selected from the group consisting of: oriented polypropylene, ployester, and cellophane and mixtures thereof having a thickness of from about 0.0005 to about 0.001 inch and having a melting point of greater than about 350° F.; (b) a layer of aluminum foil having a thickness of from about 0.0003 to about 0.0005 inch; (c) a paper layer having a basis weight per ream of from about 25 pounds to about 50 pounds; and (d) an inner layer having a thickness of from about 0.001 to about 0.002 inch of a material selected from the group consisting of polyethylene (including modified polyethylenes, polyvinyldichloride, ethyl vinyl acetate), and waxes and mixtures thereof, said material having a melting point of less than about 350° F. and said inner layer being capable of acting as a glue.

DETAILED DESCRIPTION OF THE INVENTION

The Detergent Composition

The detergent compositions of this invention comprise from about 0% to about 95% of a detergent surfactant selected from the group consisting of anionic, nonionic, ampholytic, zwitterionic and cationic surfactants and mixtures thereof; from about 10% to 95% of a detergency builder; and an effective amount, up to about 50% of air-sensitive material.

Suitable surfactants and builders for use in the compositions of this invention are well known in the prior art with representative disclosures being found in U.S. Pat. Nos. 4,145,184; 4,141,841; 4,132,680; 4,131,558; 4,123,377; 4,115,292; 4,113,644; 4,111,854; 4,101,457; 4,051,046; 3,892,681; 3,790,482; 3,749,674; 3,749,673; 3,715,314; and 3,630,923 and U.S. patent applications Ser. Nos. 849,132, Gilbert et al filed Nov. 7, 1977 and 958,587, Wee et al filed Nov. 7, 1978. All of said patents and applications are incorporated herein by reference. The air-sensitive materials of this invention include bleach materials such as alkali metal perborates and percarbonates, chlorinated trisodium orthophosphate and sodium and potassium dichloroisocynaurates and $CO_2$ reactive materials such as sodium and potassium silicates having ratios of from about 1:1 to about 3.6:1.

Forming the Pouch

The pouch can be formed by doubling a strip of laminate to place the two polyethylene, or equivalent, layers against each other and heat-sealing on two adjacent edges of the open perimeter. As will be appreciated by those skilled in the art, various folding operations can be applied to the thereby formed bag to provide a flat bottom. In a preferred embodiment the pouch is formed into a "milk carton" configuration in which the sheet of laminate is folded around a rectangular mandrel and the bottom and the open vertical side are heat sealed to form a "fin" on the exterior of the bag with the heat seal "fin" being in the center of one side. The bottom "ears" are then preferably folded back in to form a flat surface (bottom) and sealed to help maintain the flat bottom. Machines are commercially available for forming such a bag. An example is the Pneumatic Scales Corporation's Double Package Maker (The portion used to form the inner bag. The bag top in this machine is simply sealed, which is unsatisfactory for detergent usage.) In this invention the sides of the top are folded back in V folds as in a "milk carton", prior to heat-sealing across the top. Since one of the sides has the heat-seal fin in the center of one vertical side it will be recognized that this fin will then be at the apex of one of the V folds and, if of sufficient width, can be used to pull that V fold out to form a spout. Since the laminate is very flexible as compared to the materials used to form a milk carton, this use of the heat seal fin is highly advantageous. It is desirable to heat-seal the side of the top which is to form the spout to a lesser degree than the rest of the heat-seal to permit easier opening without tearing of the spout by the eventual consumer.

The particular laminate used in the formation of the pouch provides good dead-fold and reseal properties allowing the consumer to close up the spout or opening by a simple folding maneuver, preferably after the spout V fold is pushed back into place.

In another alternate structure where the heat seal fin is not on the side where the spout is desired one can use a W fold to form a small protrusion in the center of the fold which can be used as a handle.

The Laminate

Each part of the laminate is essential. The lower melting layer, e.g., polyethylene is the glue for sealing the carton and separates the paper layer and the composition to avoid interaction. The release of the seal in the formation of the spout occurs by failure along the paper/low melting layer boundary. This layer must melt below about 350° F., preferably below about 300° F. and above about 150° F. to promote sealing and avoid accidental unsealing. Preferably this layer has a thickness of from about 0.001 to about 0.0015 inch.

The preferred material for the inner layer is polyethylene. Other suitable materials include modified polyethylenes such as Surlyn and Sclaire; polyvinyl dichlorides such as Saran, ethyl vinyl acetate; and waxes.

The paper layer is essential to ensure failure of the seal during spout formation since breakage of inter fiber bonds account for much of the breakage of the seal.

Preferably, the basic weight per ream is from about 25 pounds to about 35 pounds.

The foil layer provides "dead-fold" properties and the major air barrier. Preferably the foil is from about 0.0003 to about 0.00035 inch in thickness.

The outer higher melting point layer protects the foil from cracking and gas pin-holes originally in the foil layer. It allows transfer of heat without suffering damage or sticking to the heater element. Preferably, the thickness of this layer is from about 0.0005 to about 0.00075 inch.

The preferred material for the outer layer is oriented polypropylene. Preferably the material has a melting point above about 400° F. Polyesters like Mylar and cellophane films can also be used.

As is known the art the foil must be bonded to the adjacent layers using a glue which can be polyethylene or another adhesive. The laminates can be either coextruded or adhesive mounted.

All parts and percentages and ratios herein are by weight unless otherwise specified.

The following example demonstrates the invention.

EXAMPLE

A pouch was formed from a laminate comprising a 0.005 inch layer of oriented polypropylene; aluminum foil having a thickness of 0.0003 inches; bleached MG paper having a basis weight of 25 pounds per ream; and 0.0015 inch layer of polyethylene. A piece of this laminate 11 inches by 12 inches was folded over so that the polyethylene touched the polyethylene and heat-sealed on one of the shorter edges and the long edge to form an approximate ½ inch heat-seal fin, the resulting bag was opened and formed into a rectangular carton by means of a mandrel with the fin in the center of one side and the resulting ears on the sealed end were folded back in and sealed with a hot melt glue to the bottom to stabilize the bottom in a flat configuration, the open bag was then filled with a granular detergent product comprising about 45% sodium tripolyphosphate, about 10% chlorinated trisodium orthophosphate, about 2½% of a polypropylene oxide, polyethylene oxide, low-foaming nonionic surfactant, about 14% sodium silicate having $SiO_2:Na_2O$ ratio of about 2.9, about 3% miscellaneous ingredients such as perfume, suds suppressor, dye, etc. and the balance water (the silicate is air-sensitive in that carbon dioxide in the air tends to react with the silicate to form insolubles. Also, the chlorinated trisodium orthophosphate will react with air giving a loss of bleaching ability). There was about 35 ounces of product in the open bag. The top was then sealed by folding the opposing sides of the square bag into conventional V-type folds with the heat-sealed fin inside the apex of one of the Vs and then heat-sealing across the top. On the side where the spout was desired (with the fin), there was only a ⅛ inch heat-seal.

This product can then be sold as is, or with identical packages in a cardboard box which needs no protection for the composition. In use, the consumer grasps the heat-seal fin in the center of the V fold on the spout side of the top and pulls to form a spout for pouring. After the original use the spout is then reclosed by pushing the V fold back into place. Additional sealing folds may be made if desired.

What is claimed is:

1. A granular detergent composition comprising at least one air-sensitive ingredient in a pouch formed by heat sealing a laminate comprising:
    (a) an outer layer of a material having a melting point greater than about 350° F., selected from the group consisting of: oriented polypropylene, polyester, and cellophane and mixtures thereof, having a thickness of from about 0.0005 to about 0.001 inch;
    (b) a layer of aluminum foil having a thickness of from about 0.0003 to about 0.0005 inch;
    (c) a layer of paper having a basis weight per ream of from about 25 pounds to about 50 pounds; and
    (d) an inner layer of a material having a thickness of from about 0.001 to about 0.002 inch and a melting point between about 150° and 350° F., selected from the group consisting of polyethylene, wax, and mixtures thereof, said material being a hot melt glue, said pouch comprising a structure which can be destructively rearranged to form a reclosable spout.

2. The composition of claim 1 wherein the laminate's outer layer is oriented polypropylene and the laminate's inner layer is polyethylene.

3. The composition of claim 2 wherein the thickness of the outer layer is about 0.0005 inch, the foil thickness is about 0.0003 inch, the paper's basis weight per ream is about 25 pounds, and the inner layer's thickness is about 0.001 inch.

4. The composition of claim 1 wherein the thickness of the outer layer is about 0.0005 inch, the foil thickness is about 0.0003 inch, the paper's basis weight per ream is about 25 pounds, and the inner layer's thickness is about 0.001 inch.

5. The composition of claim 1 in which the air-sensitive material is selected from the group consisting of chlorinated trisodium orthophosphate, sodium dichloroisocyanurate, potassium dichloroisocyanurate, sodium silicates and potassium silicates having $SiO_2:Na_2O$ and $SiO_2:K_2O$ ratios of from about 1:1 to about 3.6:1 and mixtures thereof.

6. The composition of claim 5 wherein the laminate's outer layer is oriented polypropylene and the laminate's inner layer is polyethylene.

7. The composition of claim 6 wherein the thickness of the outer layer is about 0.0005 inch, the foil thickness is about 0.0003 inch, the paper's basis weight per ream is about 25 pounds, and the inner layer's thickness is about 0.001 inch.

* * * * *